Nov. 25, 1930.  W. C. BARKER  1,783,104
BRAKE MECHANISM
Filed March 1, 1929   2 Sheets-Sheet 1
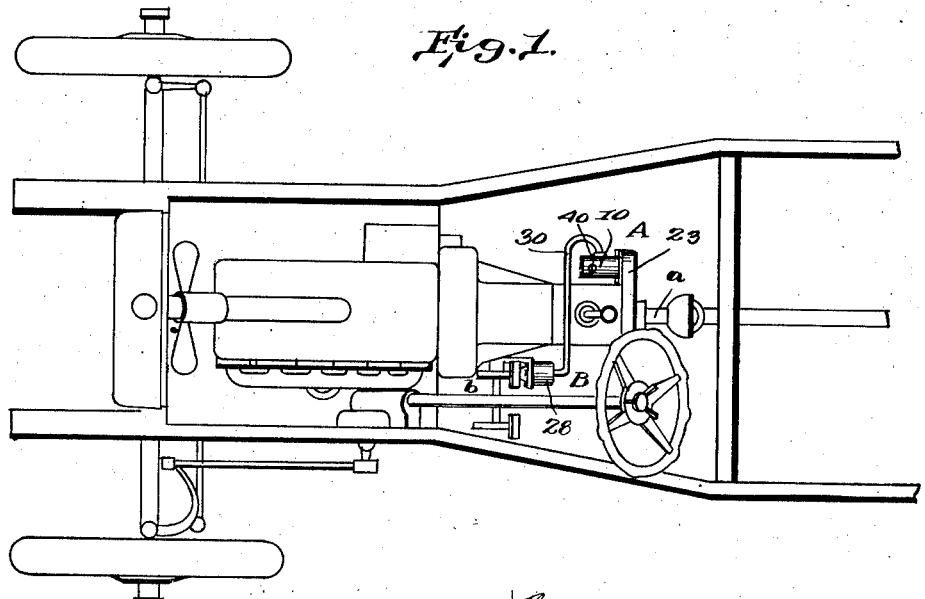
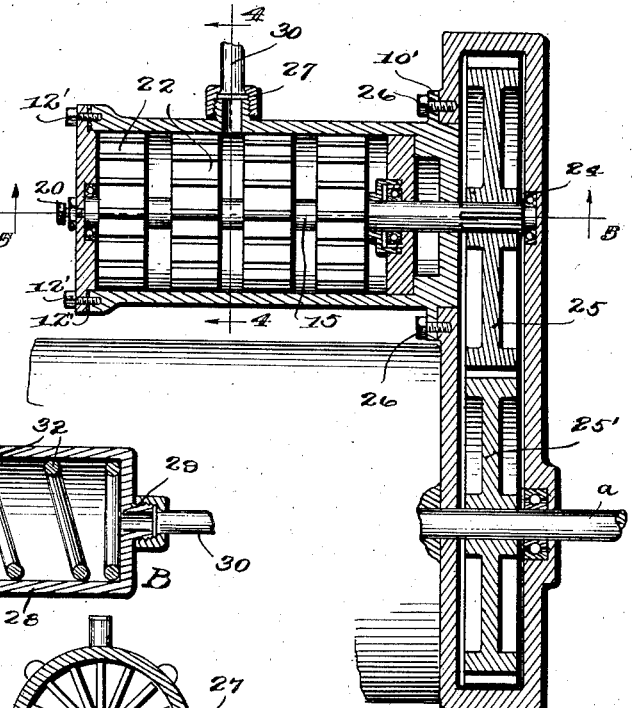
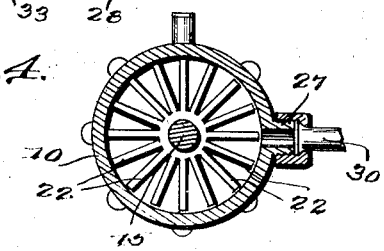
WITNESSES
INVENTOR
Winston C. Barker
BY
ATTORNEY

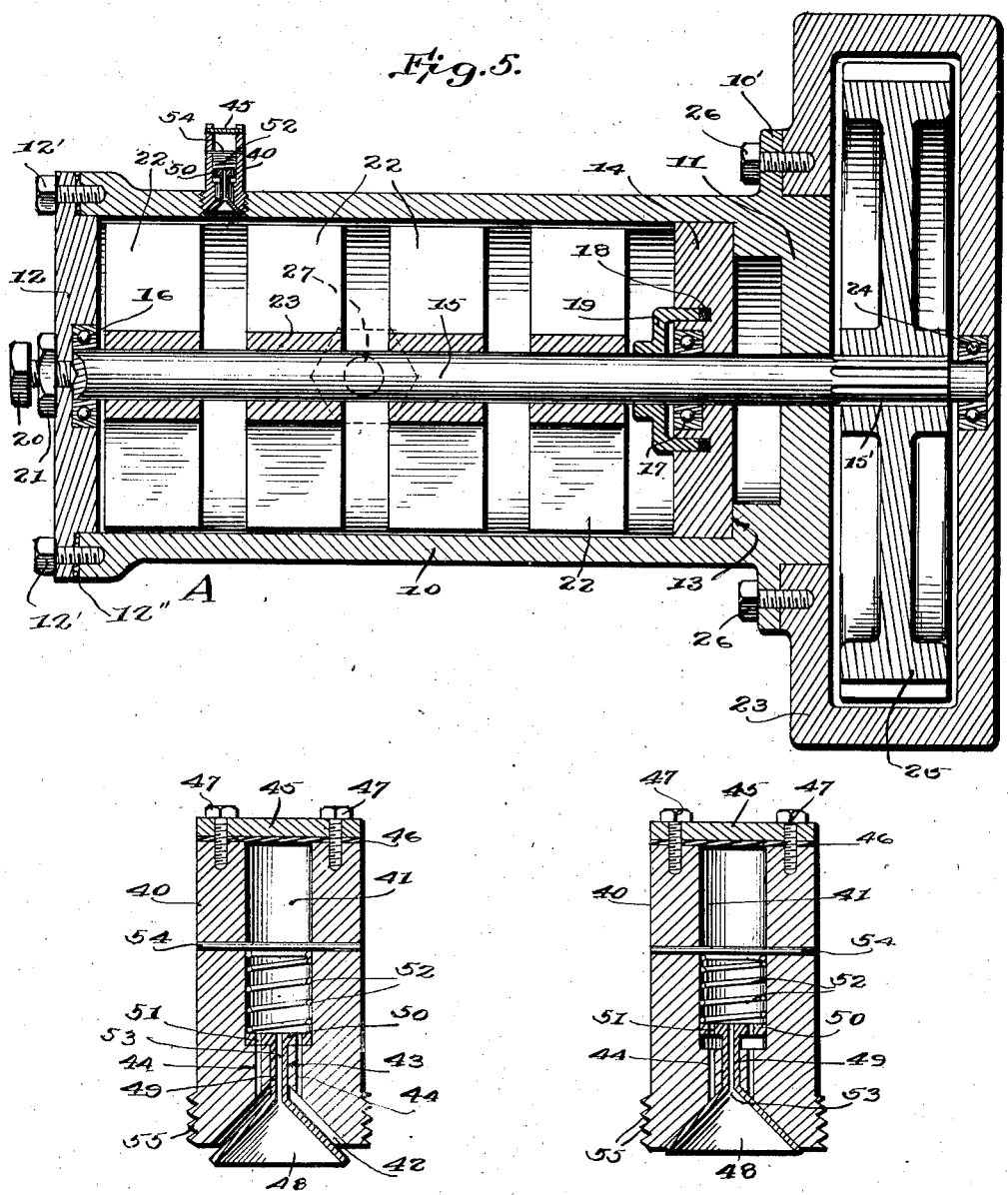

Patented Nov. 25, 1930

1,783,104

UNITED STATES PATENT OFFICE

WINSTON C. BARKER, OF DETROIT, MICHIGAN

BRAKE MECHANISM

Application filed March 1, 1929. Serial No. 343,797.

This invention appertains to improvements in brake mechanisms generally, and more particularly to a fluid pressure type of the same for use on motor vehicles and the like.

An object of the invention is to provide a brake mechanism of the class set forth, which is constituted in a fluid operated braking means to be operatively connected to the driving mechanism of a motor vehicle or the like, and a separate fluid pressure unit connected to the braking unit by a fluid transmission line, the pressure unit being mechanically actuated from the usual brake pedal of the vehicle whenever it is desired to render the braking unit operative or inoperative.

Another object of the invention is to provide a brake mechanism of the type mentioned, wherein the fluid operated braking means may be embodied in a single unit, and operably connected to the propeller shaft of a motor vehicle to obtain complete braking effect therethrough on the driving wheels of the vehicle.

A further object of the invention is to provide a brake mechanism as hereinbefore characterized, which will have the advantages of being comparatively inexpensive to manufacture, quiet in operation, easy to control, and of low cost for installation, operation and maintenance.

With the foregoing and other equally important objects and advantages in view, the invention resides in the certain new and useful combination, construction and arrangement of parts as will be hereinafter more fully described, set forth in the appended claim, and illustrated in the accompanying drawing, in which:

Figure 1 is a fragmentary top plan view of the forward end portion of the chassis of a motor vehicle, showing a practical installation of the invention thereon, Figure 2 is an enlarged horizontal section through the fluid brake cylinder and the housing for the intermeshing gears employed for operatively coupling the brake device to the power transmission or propeller shaft of the motor vehicle, Figure 3 is an enlarged vertical section through the foot pedal actuated fluid or pressure control device, a fragment of the connected end portion of the foot pedal and its supporting bracket being shown in side elevation, Figure 4 is a vertical transverse section through the brake cylinder per se, the same being taken on the line 4—4 of Figure 2, Figure 5 is an enlarged vertical longitudinal section through the brake cylinder and the attached gear casing, the same being taken on the line 5—5 of Figure 2, Figure 6 is an enlarged longitudinal section through the air compression device employed in connection with the brake cylinder, the valve forming a part of the device being shown in open position, and Figure 7 is a view similar to that of Figure 6, but showing the valve in its closed position.

Referring to the drawings, wherein like characters designate corresponding parts throughout the several views thereof, the embodiment of the invention, as shown therein by way of example, is constituted generally in the brake cylinder unit A, which is operably connected to one of the driving elements of an automobile, preferably the main power transmission or propeller shaft $a$, and a pressure control device B, which is operably connected to the usual service brake pedal $b$.

The brake cylinder unit A is comprised in a hollow cylindrical body 10, which is closed by an integral wall 11 at one end, and a removable wall 12 at its other end. The interior of the cylinder 10, just inwardly of the integral end wall 11, is shouldered, as at 13, to seat against the same a bearing member 14, which is press fitted into place. Journaled centrally through the bearing member 14 and the end wall 11 is a shaft 15, which has its forward end journaled in the annular ball bearing 16, which is countersunk in the inner face of the removable end member or plate 12. Similarly countersunk in the opposed face of the bearing member or plate 14, and surrounding the shaft 15, is a second annular ball bearing 17. Formed in this bearing member or plate 14, in concentric relation to the ball race 17, is an annular groove or channel into which is positioned packing 18, the same being compressed in place by the inserted annular flanged portion of a cup-like member 19 mounted on the shaft 15. This compression of the packing 18 by the member 19 is obtained by pressure exerted on the forward end of the shaft 15 through the medium of an adjusting screw 20, which is threaded centrally inward of the end plate 12, and bears against the shaft end for the purpose. The inner end of this screw 20 is preferably of conical form to fit into a similarly shaped depression formed in the opposed end of the shaft 15, substantially as shown. A lock nut 21 is preferably provided on the outer threaded portion of the screw 20 to hold the same at any point of adjustment. This arrangement also prevents any end thrust of the shaft 15.

Mounted on the shaft 15, within the cylinder 10, are a plurality of sets of vanes 22, which are disposed radially of hub members 23 keyed on the shaft 15 for rotation therewith. As shown, the removable end plate or wall 12 is secured on the cylinder end by means of screws or the like 12', and is preferably seated against a gasket 12'' to prevent the escape of the liquid with which the cylinder body 10 is to be filled, therebetween.

The rearwardly directed end of the shaft 15 is projected outwardly of the end wall 11 and into a gear casing 23, which has its adjacent side wall formed to provide a circular opening snugly engaged over the end of the cylinder body 10. The extreme rear end of the shaft 15 is projected into the open center of an annular ball race 24, which is countersunk into the inner face of the opposite outer side wall of the casing 23, while the portion of the shaft extending between the opposite side walls of the latter is splined, as at 15', for the keying thereon of a toothed gear 25. The cylinder 10 is formed to provide an annular flange 10' adjacent its rear end, which is abutted by the bossed portion of the opposed forward wall of the gear casing 23, and is secured thereto by means of the screws 26. The fluid, preferably a suitable oil, is to be admitted to the cylinder 10 inwardly through an outwardly nippled inlet 27 at one side of the same.

The gear casing 23 is preferably elongated horizontally to one side of the brake cylinder 10, so as to house within the same a second toothed gear 25', which is arranged in mesh with the gear 25, and is keyed on the usual power transmission shaft $a$, forming a part of the propeller shaft of the motor vehicle. As shown in Figure 2, an annular ball race 24' may also be countersunk in the inner face of the outer wall portion of the extended portion of the casing 23 to journal within the same the rearwardly extending portion of the power transmission shaft $a$. When disposed in operative position, the cylinder 10 and the casing 23 will be supported directly from the adjacent portions of the casing of the usual gear-set or speed changing mechanism of which the shaft $a$ is a part.

The pressure control device B is also comprised in a second cylindrical body 28, which has its outer or rearwardly directed end closed by a wall, except for an outwardly nippled outlet 29 formed with the latter, while its other or forward end is open and surrounded by an integrally formed flange 28'. The nippled outlet 29 is connected by means of a conduit 30 with the nippled inlet 27 of the brake cylinder body 10.

Slidably mounted within the cylinder 28 is a piston 31, which is normally urged toward the forward end thereof by a coiled spring 32, also housed within the body 28. The forward open end of the cylinder body 28 is closed by a bearing member or plate 33, which has its peripheral edge formed of a reduced thickness to provide an annular flange, as at 33', to be clamped between the flange 28', extending from the adjacent end of the body 28, and a similar flange 34' formed at the larger open end of a hollow and substantially conical guide member 34, which several flanges are secured together by means of screws or the like 35.

An actuating rod 36 projects forwardly from the center of the piston 31 and outwardly through alined openings formed centrally of the bearing member 33 to the guide member 34, and is pivotally connected, as at 37, at its forward foremost end to the lower end of an angled arm 38 projecting outwardly from the lower pivoted end portion of a foot pedal $b$. The pivot at the outer end of the piston rod 36 is engaged in an elongated slot 38' formed longitudinally of the free end of the pedal arm 38, so as to compensate for the arc of swing of the latter, when the pedal $b$ is operated. This pressure control cylinder 28 will be suitably supported in operative position adjacent to the arm 38 of the foot pedal $b$, and for the purpose may be mounted on the bracket 39 to which the latter is pivoted.

In one instance of the operation of the device, as thus constructed and arranged, the braking cylinder 10, the pressure control cylinder 28 and the conduit 30 will be filled with oil, and with the brake pedal $b$ in its normally inoperative position, the power transmission shaft and the wheels of the motor vehicle will be free and unrestrained. With the motor running and the power transmission shaft $a$ operating at any one of the several speeds of the transmission gearing, the gear 25' will drive the gear 25, and the vanes 22 will be rotated ineffectively in the body of oil within the brake cylinder 10. This is also true when power is cut off from the propeller shaft of the motor vehicle and the driving wheels thereof are rotating under momentum, or when the vehicle is coasting down grade. Now, when it is desired to slow down or stop the motor vehicle, the operator will depress the foot pedal $b$, and force the piston 31 rearwardly of the pressure control cylinder 28, and against the tension of the coiled spring 32. Simultaneously with the inward movement of the piston 31, the oil in the system will be placed under pressure, and the further rotative movement of the vanes 22 of the brake rotor retarded to a greater or lesser degree, depending upon the pressure exerted on the piston 31 by the action of the foot pedal $b$ when being depressed, and the motor vehicle will be correspondingly slowed down, and to a greater degree after the power has been cut off from the transmission shaft $a$ by the throwing out of the usual clutch device on the motor vehicle. When the full pressure of the foot of the operator is brought to bear on the foot pedal $b$, the pressure on the oil within the brake cylinder 10 will be greatest, and the brake rotor will be incapable of further rotation, so that the vehicle will be brought to a full stop.

In the event of employing the brake cylinder 10 with a less amount of oil than is necessary to completely fill the same, the control cylinder 28 and the conduit 30, a compression valve (Figures 6 and 7) will be employed, and the same is in the nature of a cylindrical metal body 40, which has a bore 41, forming an air chamber, extending inwardly of its outer end for a major portion of its length, and a substantially conical depression 42 in its inner end, which communicates with the inner end of the bore 41 through a similar central bore 43, and a plurality of passageways 44 surrounding the bore 43. The outer end of the body 40 is provided with a closure plate 45, which is superposed on a gasket 46, and secured in position therewith by means of screws 47.

A substantially conical valve body 48 is cooperatively disposed with respect to the depression 42, and has a stem 49 projecting inwardly of the small central bore 43. A piston head 50 is carried at the free end of the stem 49, and is arranged for sliding fit within the larger bore or air chamber 41. This piston 50 is formed with a series of apertures 51, which register with the passageways 44 aforesaid at all times, and a coil spring 52 normally urges the piston 50 against the inner end wall of the bore or air chamber 41. The stem 49 is also provided with a longitudinal bore 53, which opens at its lower end into the apex of the conical depression in the lower side of the valve body 48, and at its upper end through the piston 50 and into the bore or air chamber 41. The spring 52 is positioned within the bore or air chamber 41 with one end bearing directly against the piston 50, and the other end against an abutment in the form of a cross pin 54, extending diametrically through an intermediate portion of the body 40.

In its normal position, the valve 48 is unseated from the depression 42 by the action of the spring 52 against the piston 50. The inner or lower end of the body 40 is exteriorly screw-threaded, as at 55, for engagement in a complementally threaded opening formed in the brake cylinder 10, which opening is preferably located in the upper side of the latter substantially as is shown in Figures 1 and 5.

In the operation of the brake mechanism, in this instance of the same, upon the depression of the foot pedal $b$, the piston 31, in the pressure control cylinder 28, moves against the tension of the coil spring 32, and forces the fluid from the pressure control cylinder 28 and the conduit 30, and into the brake cylinder 10. As the fluid or oil fills the brake cylinder 10, the air content of the latter is forced inwardly of the conical depression in the lower side of the valve body 48, and through the passage 53 in the stem 49, and into the large bore or air chamber 41 where it is compressed. The pressure of the air being so forced by the fluid or oil from the brake cylinder 10, pockets within the conical depression of the valve body, and acts to close the latter on the conical depression or seat 42 at the inner end of the body 40, so that the air passes to the bore or chamber 41 only through the passage 53 in the valve stem 49. Now, when the foot pedal $b$ is released, the fluid or oil will be withdrawn from the brake cylinder 10, and back into the pressure control cylinder 28, and the conduit 30, by the action of the return movement of the piston 31, to normal position, and such withdrawal of the fluid or oil will be assisted by the pressure of the air in the bore or chamber 41 expanding outwardly of the alined passageways 44 and 51 in the body 40 and the piston 50, thereby forcing the valve 48 outwardly of the depression or seat 42, and discharging back into the brake cylinder 10.

It is to be noted that the rotor within the brake cylinder 10 may be directly geared to the power transmission or propeller shaft $a$ of a motor vehicle, as shown in Figures 1 and 2, or the same may be operatively connected therewith or to any other driven part of the vehicle in any other suitable or feasible manner in order to secure the greatest efficiency in operation.

Without further description, it is thought that the features and advantages of the invention will be readily apparent to those skilled in the art, and it will of course be understood that changes in the form, proportion and minor details of construction may be resorted to, without departing from the spirit of the invention or its scope as claimed.

Having thus fully described the invention, what is claimed is:

The combination with the propeller shaft of a motor vehicle and the usual foot brake pedal thereof, a brake cylinder, a rotor within said cylinder and operably connected to the said propeller shaft, a pressure cylinder, a conduit connecting said brake cylinder, a body of liquid confined within said cylinders and conduit, a piston within said pressure cylinder and operably connected to said foot pedal whereby to force the liquid under pressure into said brake cylinder to completely fill the same and thereby restrain the normal free rotation of said rotor and the said propeller shaft, and an air compression valve connecting said brake cylinder.

WINSTON C. BARKER.